Sept. 20, 1938. R. HOFSTETTER 2,130,799
HYDRAULIC BRAKE SYSTEM
Filed March 16, 1934
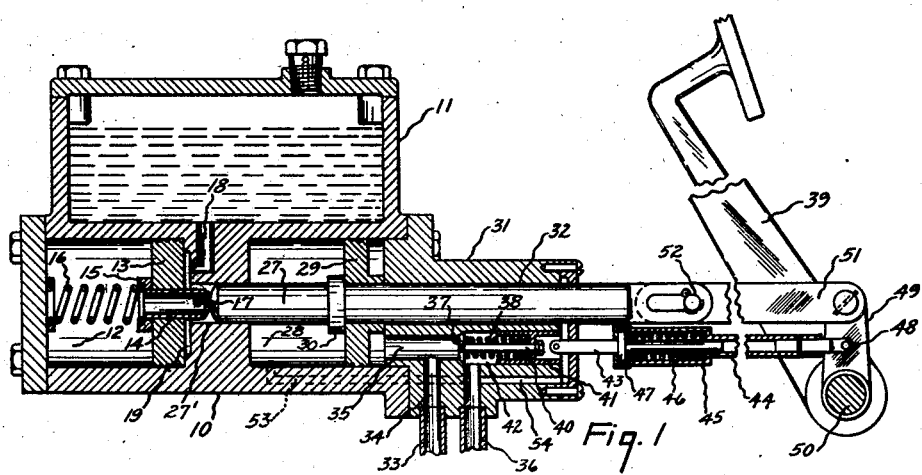
Inventor
Robert Hofstetter
By Beaman + Langford
Attorney Patented Sept. 20, 1938

2,130,799

UNITED STATES PATENT OFFICE 2,130,799

HYDRAULIC BRAKE SYSTEM

Robert Hofstetter, Jackson, Mich.

Application March 16, 1934, Serial No. 715,846

2 Claims. (Cl. 303—84)

The present invention relates to improvements in the hydraulic brake system for automotive vehicles, and the like.

In hydraulic brake systems in use at the present time frequently line failures occur between the cylinder directly associated with the brake shoe and the master cylinder. When this happens the entire system is rendered useless.

Thus one of the objects of the present invention is to provide a system which overcomes the above stated condition and which greatly increases the factor of safety of the vehicle by assuring the proper operation of, at least, two brakes in the convenient, four wheel brake system, upon line failure.

Another object is to provide simple, inexpensive and effective means for assuring a proper supply of operating fluid to the braking system at all times as well as providing for expansion and contraction of the fluid under temperature changes.

A further object is to provide a simple and effective mechanical booster for brake application which is under the direct control of the manually operated brake pedal and which does not affect the manual operation of the braking system, if desired, or should it become necessary upon failure of the mechanical booster.

Other objects and advantages of the invention residing in the combination and construction and arrangement of parts will become apparent from the following description when considered in connection with the accompanying drawing. The invention is clearly defined in the claims.

In the drawing wherein there are illustrated, by way of example, several of the innumerable forms which the present invention may take, Fig. 1 is a longitudinal cross sectional view through the master cylinder, reservoir and mechanical booster showing the association with the brake pedal, Fig. 2 is a fragmentary end view taken from the left of Fig. 1, Fig. 3 is a cross sectional view taken upon line 3—3 of Fig. 2 through the master and auxiliary cylinders, Fig. 4 is a fragmentary longitudinal cross sectional view of a modified form of mechanical booster, Fig. 5 is an enlarged fragmentary cross sectional view of a modified auxiliary cylinder showing valve mechanism for sealing a line upon failure or rupture thereof, and Fig. 6 is a fragmentary view taken on line 6—6 of Fig. 5 showing the washer construction.

Having specific reference to the drawing in Fig. 1 a suitable casting 10 constitutes a master reservoir 11 for the operating fluid. A master cylinder 12 is provided centrally of the casting 10 and at one end of which a piston 13 is received for longitudinal reciprocation. Located within the piston 13 for limited relative movement relative thereto is provided a hollow valve 14. As shown, a spring seat 15 is associated with the valve 14 with which the spring 16 abuts to continuously urge the valve 14 and the piston 13 to the right, as viewed in Fig. 1. The valve 14 is closed at the right and with the left end opening into the cylinder 12 forward of the piston 13. A port 17 is located in the valve 14 which communicates with the reservoir 11 through a passage 18 opening into a space 19, located at the rear of the piston 13.

Ports 20 are provided which communicate with the auxiliary cylinders 21 which are two in number in the embodiment illustrated. Pistons 22 are received within the cylinders 21 for longitudinal reciprocation. These pistons, as shown, have longitudinally spaced cylinder engaging portions which approximate the diameter of the cylinders 21 for guiding purposes with the major extent of the pistons, preferably of substantially less diameter than the cylinders 21. With such a construction the pistons 22 will reciprocate without binding and as the area of the pistons 22 in actual sliding contact with the walls of the cylinders 21 is not great a sufficient amount of oil is permitted to seep past the pistons 22 to compensate for any slight leakage in the system. In order to take care of expansion due to temperature changes check valves 23 are preferably located in the pistons to enable the operating fluid to flow back into the reservoir 11. Springs 24 continuously urge the piston to the left as viewed in Fig. 3. Upon the directing of fluid pressure against the left end of the pistons 22, the fluid located forward of the right ends of the pistons is forced out through the outlets 25 which are coupled to the lines (not shown) extending to the operating cylinder located upon the wheel brake of the front and rear wheels, for example. Upon failure of either line connected to the auxiliary cylinders 21, the release of pressure forward of the piston will result in the piston 22 being urged to the right and the closing of the inner end 26 of the outlet 25 by the forward end of the piston 22 to avoid further loss of the operating fluid from the reservoir.

It should become apparent from the foregoing description that by coupling the front wheel brake cylinders with the line communicating with one of the auxiliary cylinders and the rear wheel brake cylinder with the other, upon line failure only the front or the rear brakes, as the case may be, are rendered useless. Obviously an auxiliary cylinder may be provided for each wheel brake with individual lines. It is further to be understood that the present arrangement possesses the same equalizing characteristics of the systems now in use.

For creating the necessary operating pressure within the system a longitudinally slidable rod 27 is provided which may be actuated by the usual brake pedal, a mechanical booster or both as will be hereinafter described. This rod is closely fitted within the hole 27' which constitutes a guide therefor. Initial movement of the rod 27 to the left from the position shown in Fig. 1 will result in the valve 14 being moved to the left relative to the piston 13. Such movement by the rod 27 and valve 14 will result in the closing of the port 17 by the guiding wall of the piston 13. Further movement of the rod 27 will bring the same into abutment with the piston 13 which will then be urged to the left to create the necessary additional operating pressure in the system.

As illustrated in Fig. 1 a cylinder 28 is located at the right end of the casting 10 in axial alignment with the cylinder 12. A piston 29 is received with this cylinder for reciprocation through which the rod 27 extends. The piston 29 may be either fixedly secured to the rod 27 or slidable thereupon. Preferably an annular shoulder 30 is provided upon the rod 27 against which the piston abuts when urged to the left, to mechanically operate the brakes. The shoulder 30 also acts to return the piston to the position shown in Fig. 1. With the piston 29 slidably received upon the rod 27, manual actuation of the rod is facilitated as it is not necessary to traverse the piston throughout the length of the cylinder 28. The end of the cylinder 28 is closed by a casting 31 having a bore 32 through which the rod 27 extends. Within the casting 31 is disposed and housed the necessary ports and valve mechanism for directing the fluid pressure against the piston 29 to mechanically apply the brakes. In my preferred form, oil, or other suitable fluid, under pressure is admitted through the inlet 33 and is directed into the cylinder 28 against the piston 29 through the passages 34—35. An outlet 36, which would be connected with the crank case when the pressure oiling system of the vehicle is employed as a source of operating power, is in communication with the passage 35. Such communication is interrupted or constricted by a valve 37 which is lightly urged to a seat by the spring 38 with the brake pedal 39 in the manner shown. The stem 40 of the valve 37 is axially slidable relative in its carriage 41 received for reciprocation in a bore 42 of the casting 31. It is to be understood that the slot of the lost motion linkage 52 is so designed and its relation so corelated with reference to the strength of the spring 38 that the fluid pressure built up behind the piston 29 always opens the valve 37 before the piston 29 has moved sufficiently to take up the lost motion and thus avoid urging the link 51 to the left under full pressure. This carriage is reciprocated through the linkage connected to the brake pedal consisting of a rod 43 having one end connected to the carriage 41 and the other end slidably received within the tubular link 44. The link 44 is enlarged at 45 to house the spring 46 which acts against an annular shoulder 47 upon the rod 43 to urge the rod 43 to the position shown. The link 44, which may be connected to the brake pedal in any suitable way, is shown as attached at 48 to an arm 49 which is rocked about the shaft 50 as a unit with the brake pedal. At the upper end of the arm 49 a horizontal link 51 is provided which has a lost motion connection with the rod 27 as at 52.

In operation, with the brake pedal in the position shown with the brakes released, fluid under pressure will flow through the inlet 33, hence into the passage 35 filling the space back of the piston 29. Because of the light compression of the spring 38, the pressure of the fluid will force the valve 37 from its seat and flow out through the outlet 36 without building up sufficient pressure to move the piston 29 to the left. When the brake pedal is depressed the carriage 41 will be moved to the left gradually increasing the compression of the spring 38 to urge the valve 37 toward a seat to gradually decrease the flow of fluid through the outlet 36. The result is the gradually building up of pressure back of the piston 29 to move the same to the left to effect a smooth, uniform application of the brakes. Additional movement of the link 44 after the valve 37 has been fully seated will result in the compression of the spring 46 which, it is to be understood is considerably stiffer than the spring 38. In the event of failure of the mechanical booster or desire to manually operate the brakes, the rod 27 is moved to the left through the lost motion linkage 52; the link 51 being capable of only a limited movement without actuating the rod 27. Conventional means (not shown) return the brake pedal and the associated mechanism to the position shown in Fig. 1 after manipulation. Conduit 53 communicating with the outlet 36 drains into the crankcase any of the operating fluid which may pass the piston 29. A conduit 54, likewise communicating with the outlet 36, drains any accumulation of operating fluid which may pass the rod 27 and carriage 41.

In Fig. 4 is shown a modified embodiment of my mechanical booster in which an inlet 55 communicates with the cylinder 28 through a bore 56. A hollow piston valve 57 having a tapered port 58 is slidably received within the bore 56 and when moved to the left from the position shown permits a gradually increasing flow of operating fluid to be directed against the piston 29. As the valve 57 is moved to the left to open the inlet 55 the forward end of the valve 57 gradually closes the outlet 56'. As will be readily understood this arrangement will result in a smooth, gradual actuation of the brake mechanism.

Referring to Fig. 5, a modified auxiliary cylinder structure is shown in which the travel of the piston to the extreme right upon decrease in pressure upon the forward end of the piston, as would take place upon line failure, closes a check valve to avoid loss of operating fluid. As illustrated the piston 59 carries a plunger 60 which extends beyond the forward end of the piston. A ball valve 61 is located within the chamber 62 which communicates with the outlet 63 leading to the wheel brake cylinder. A spring stressed plunger 64 urges the ball valve 61 to a seat against the washer 65 which has a serrated edge 66 to permit the operating fluid to flow past the ball valve through the channels 67 into the chamber 62 and hence to the outlet 63. Upon line failure the piston 59 will be urged to the extreme right of the auxiliary cylinder by the pressure in the master cylinder with the result that the plunger 60 forces the ball valve to the dotted line position closing the outlet. The valve 61 in this position will be held to a seat by the plunger 64. After repair has been made it becomes necessary to manually force the ball valve to the position shown in Fig. 5.

From the foregoing description it should become apparent to those versed in the art that the present invention consists of three major features all of which may be advantageously employed in combinations and arrangements other than those shown. At the same time I have combined all these features into a compact unitary commercial structure, which may be inexpensively constructed, which provides a factor of safety not heretofore obtained, and which results in smooth, uniform actuation, at all times, of the brake mechanism either manually or mechanically. It is to be understood that I do not intend to limit the invention to the exact details and combinations and arrangement of parts shown but do intend to include such obvious changes and modifications as will readily suggest themselves and fall within the scope of the appended claims.

Having described my invention what I claim as new and desire to protect by Letters Patent is:

1. In a hydraulic brake system, a master cylinder, a plurality of auxiliary cylinders having communication with said master cylinder, outlets associated with each of said auxiliary cylinders, pistons located in said master and auxiliary cylinders, means acting upon said master piston to direct fluid under pressure against one end of said auxiliary pistons to move the same in one direction to build up fluid pressure, valves located in said outlets and means associated with said pistons for actuating said valves to close said outlet upon reduction of fluid pressure in the outlet end of said auxiliary cylinders.

2. In a hydraulic brake system, an auxiliary cylinder, an outlet from said cylinder, a piston located in said cylinder, means directing fluid under pressure against said piston to move the same in a direction to build up pressure in said cylinder, a valve in said outlet, and means connected to said piston for actuating said valve to close said outlet upon a reduction of pressure in said auxiliary cylinder.

ROBERT HOFSTETTER.